US012472540B2

(12) United States Patent
Bardini

(10) Patent No.: US 12,472,540 B2
(45) Date of Patent: Nov. 18, 2025

(54) APPARATUS AND METHOD FOR REMOVING LABELS FROM REUSABLE CONTAINERS

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 180 days.

(21) Appl. No.: 17/914,833

(22) PCT Filed: Mar. 23, 2021

(86) PCT No.: PCT/EP2021/057489
§ 371 (c)(1),
(2) Date: Sep. 27, 2022

(87) PCT Pub. No.: WO2021/197939
PCT Pub. Date: Oct. 7, 2021

(65) Prior Publication Data

US 2023/0142235 A1 May 11, 2023

(30) Foreign Application Priority Data

Apr. 2, 2020 (IT) ........................ 102020000006946

(51) Int. Cl.
*B08B 9/08* (2006.01)
*B08B 9/28* (2006.01)
*B08B 9/32* (2006.01)

(52) U.S. Cl.
CPC .............. *B08B 9/083* (2013.01); *B08B 9/283* (2013.01); *B08B 9/32* (2013.01)

(58) Field of Classification Search
CPC ........... B08B 9/083; B08B 9/283; B08B 9/32; B08B 1/16
See application file for complete search history.

(56) References Cited

U.S. PATENT DOCUMENTS 4,997,329 A * 3/1991 Hanamoto .......... B65B 69/0033 83/402
5,317,794 A * 6/1994 Lerner ...................... B08B 9/28 156/709

(Continued)

FOREIGN PATENT DOCUMENTS

CN 1086747 A 5/1994
DE 19618363 A1 * 6/1997 ............... B08B 1/04

(Continued)

OTHER PUBLICATIONS

Ministry of Economic Development, Search Report and Opinion (with English translation), Italian Patent Application No. 102020000006946, 7 pages, Dec. 23, 2020.

(Continued)

*Primary Examiner* — George R Koch
(74) *Attorney, Agent, or Firm* — THOMPSON HINE LLP

(57) ABSTRACT

An apparatus for removing labels from reusable containers, which includes supporting elements for at least one reusable container, on the outer lateral surface of which at least one label to be removed is applied; the apparatus includes at least one cutting device, which is provided with at least one blade which is configured to be arranged, with its cutting portion in a position that faces at least one portion of the label, and movement elements for moving the aforesaid portion of the label which are adapted to actively impart, on command, to the portion of the label, a movement away from the outer lateral surface of the container, in order to bring the portion of the label against the cutting portion of the blade.

12 Claims, 3 Drawing Sheets

(56) References Cited

U.S. PATENT DOCUMENTS

| | | | |
|---|---|---|---|
| 5,372,672 | A | 12/1994 | Seifert et al. |
| 5,885,401 | A | 3/1999 | Eiban |

FOREIGN PATENT DOCUMENTS

| | | | |
|---|---|---|---|
| JP | S 63248698 | A | 10/1988 |
| JP | H 02166034 | A | 6/1990 |
| JP | H 06210256 | A | 8/1994 |
| JP | H 08112577 | A | 5/1996 |

OTHER PUBLICATIONS

European Patent Office (ISA/EP), International Search Report, International Application No. PCT/EP2021/057489, 3 pages, Jun. 24, 2021.
European Patent Office (ISA/EP), Written Opinion of the International Searching Authority, International Application No. PCT/EP2021/057489, 5 pages, Jun. 24, 2021.

* cited by examiner

APPARATUS AND METHOD FOR REMOVING LABELS FROM REUSABLE CONTAINERS

This application is a 371 of PCT/EP2021/057489, filed on Mar. 23, 2021.

The present invention relates to an apparatus and a method for removing labels from reusable containers.

As is known, the need is currently felt to reduce pollution caused by the plastic container and packaging dispersion in the environment.

In order to seek a solution to this problem, in some countries the use of reusable plastic containers has been imposed.

In this case, the reusable containers, which normally have a label applied on their outer surface, are returned by users after use so that they can be washed and sterilized in order to get them ready to be refilled and, therefore, reused.

A problem that occurs, once the used containers have been collected, is that of removing the labels from them.

Usually, the labels affixed to the plastic containers are taken from a ribbon of labels made of plastic material and are wound around the lateral surface of the corresponding container.

In particular, the labels are typically glued to the containers using two strips of adhesive arranged at the two opposite ends of the labels, which can, in turn, also be arranged one on top of the other.

Currently, the removal of the labels from the containers is performed by placing the labeled containers directly inside washing machines, so that the washing liquid, typically constituted by a solution of hot water and detergent products, used during the washing of the containers can result in the separation of the labels from the containers.

Although the removal of the labels in the manner described above is conceptually valid, it has been found in practice however that, owing to the difficulty of the washing liquid to penetrate into the space between the labels and the lateral surface of the corresponding containers, and owing also to the difficulty of extracting a container from a label wrapped completely around it, it often happens that the labels remain attached to the containers or that they are not fully detached from the containers.

Furthermore, it is easy for the detached labels to fill up the washing machine, clogging it and consequently compromising its correct operation. The aim of the present invention is to provide an apparatus for removing labels from reusable containers that is capable of improving the known art in one or more of the above mentioned aspects.

Within this aim, an object of the invention is to provide an apparatus for removing labels that makes it possible to ensure the complete detachment of the labels from the containers as a result of their being washed in washing machines.

Another object of the invention is to provide an apparatus for removing labels that can be used in line with other apparatuses that make it possible to prepare previously used containers for reuse.

Another object of the present invention is to provide an apparatus for removing labels from reusable containers that is capable of offering the highest guarantees of reliability and safety in operation.

A further object of the present invention is to overcome the drawbacks of the background art in a manner that is alternative to any existing solutions.

Another object of the invention is to provide an apparatus for removing labels from reusable containers that is relatively easy to implement and which can be competitive from a purely economic viewpoint as well.

This aim and these and other objects which will become better apparent hereinafter are achieved by an apparatus for removing labels from reusable containers, according to claim 1, optionally provided with one or more of the characteristics of the dependent claims.

Further characteristics and advantages of the invention will become better apparent from the detailed description that follows of a preferred, but not exclusive, embodiment of the apparatus for removing labels from reusable containers according to the invention, which is illustrated for the purposes of non-limiting example in the accompanying drawings wherein.

Figure 1:
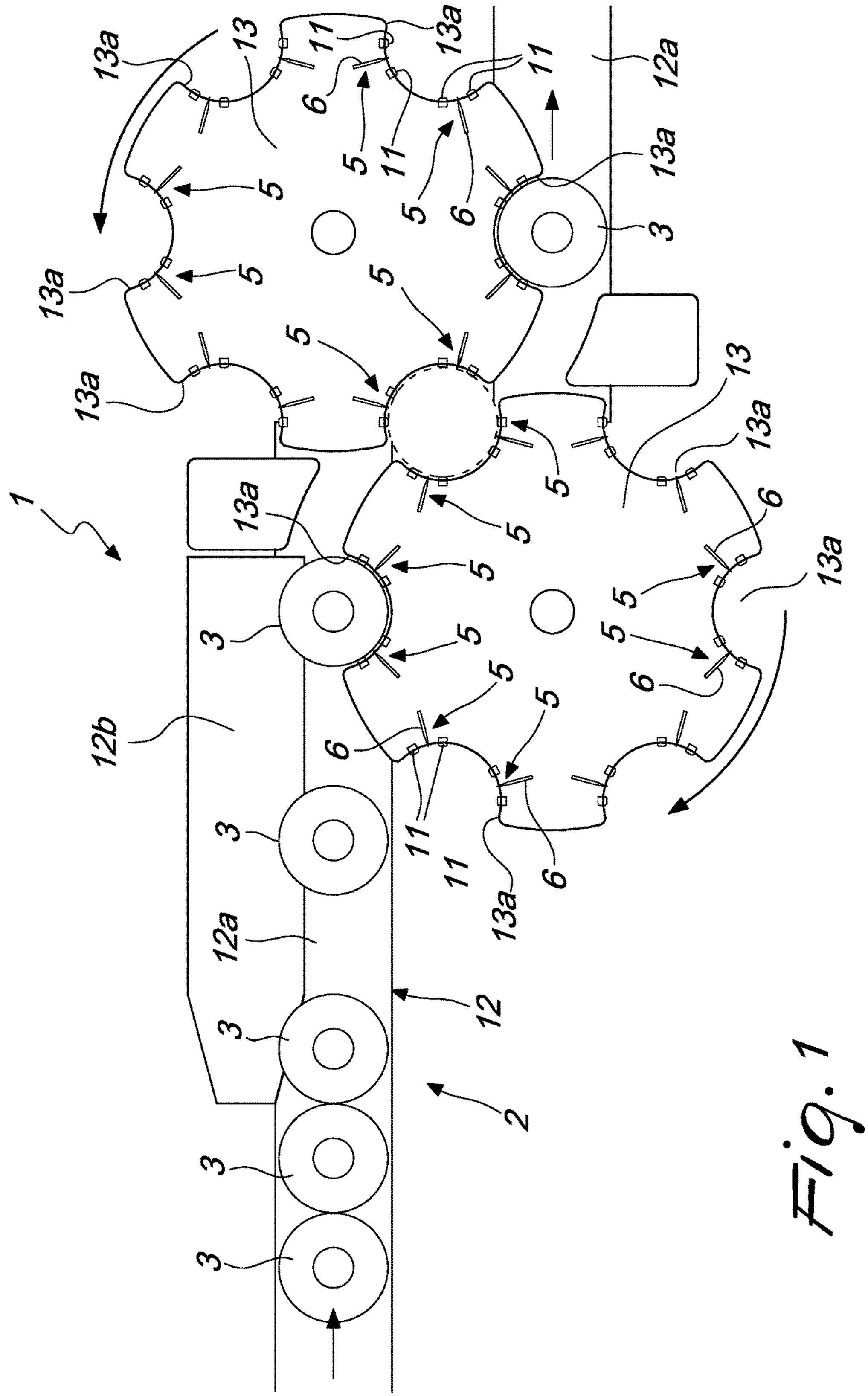
FIG. 1 is a schematic plan view from above of the apparatus according to the invention in a possible embodiment thereof.

With reference to the figures, the apparatus for removing labels from reusable containers according to the invention, generally designated by the reference numeral 1, comprises supporting means 2 for at least one reusable container 3, on the outer lateral surface of which at least one label 4 to be removed is applied.

In particular, the label 4 is wrapped around at least one portion of the outer lateral surface **3*a* of the container 3 and is applied to the outer lateral surface 3*a* of the container 3 using at least two strips of adhesive, which are located, preferably, at the longitudinal opposite ends of the label 4, one of which can be, optionally, arranged so as to overlap the other, but it is also possible that the label 4 does not wrap 360° around the container 3**.

The apparatus comprises at least one cutting device 5, which is provided with at least one blade which is arranged, or can be arranged, with its cutting portion **6*a* in a position that faces at least one portion 4*a* of the label 4 of the reusable container 3 that is placed on the supporting means 2**.

Also according to the invention, such cutting device 6 further comprises movement means for moving the portion **4*a* of the label 4, which are adapted to actively impart, on command, to the portion 4*a* of the label 4, a movement away from the outer lateral surface 3*a* of the container 3, in order to bring the portion 4*a* of the label 4 against the cutting portion 6*a* of the blade 6, so as to make an at least partial cut in the label 4**.

The cut thus made in the label 4 makes it possible, in a subsequent step of washing of the container 3, conveniently carried out in adapted washing machines, preferably using a washing liquid constituted by a high-temperature solution of water and detergent products, to facilitate the penetration of the washing liquid into the space between the label 4 and the outer lateral surface **3*a* of the container 3, so that the washing liquid can easily reach the zones of the label 4 where the strips of adhesive are present, so as to favor the detachment of the label 4 from the container 3**.

Optionally, there can be multiple cutting devices 5 arranged, with respect to the container 3, in such a way that each one can act on a different portion **4*a* of the label 4, so as to be able to make multiple cuts on the same label, and ensure, whatever the angular orientation of the container 3 about its own axis, the possibility that at least one of such cutting devices 5 can act on a corresponding portion 4*a* of the label 4 which is arranged in a position that is spaced apart from the zone of the label 4** where the strips of adhesive are.

In more detail, the above mentioned movement means of the or of each cutting device 5 comprise, advantageously, means adapted to create a difference in pressure between the face of the corresponding portion 4*a* of the label 4 that is directed toward the outer lateral surface of the container 3 and its opposite face.

Conveniently, such means adapted to create a difference in pressure comprise introduction means 7 for introducing a gas under pressure between the outer lateral surface 3*a* of the container 3 and the face of the corresponding portion 4*a* of the label 4 that is directed toward the outer lateral surface 3*a* of the container 3.

Figure 2:
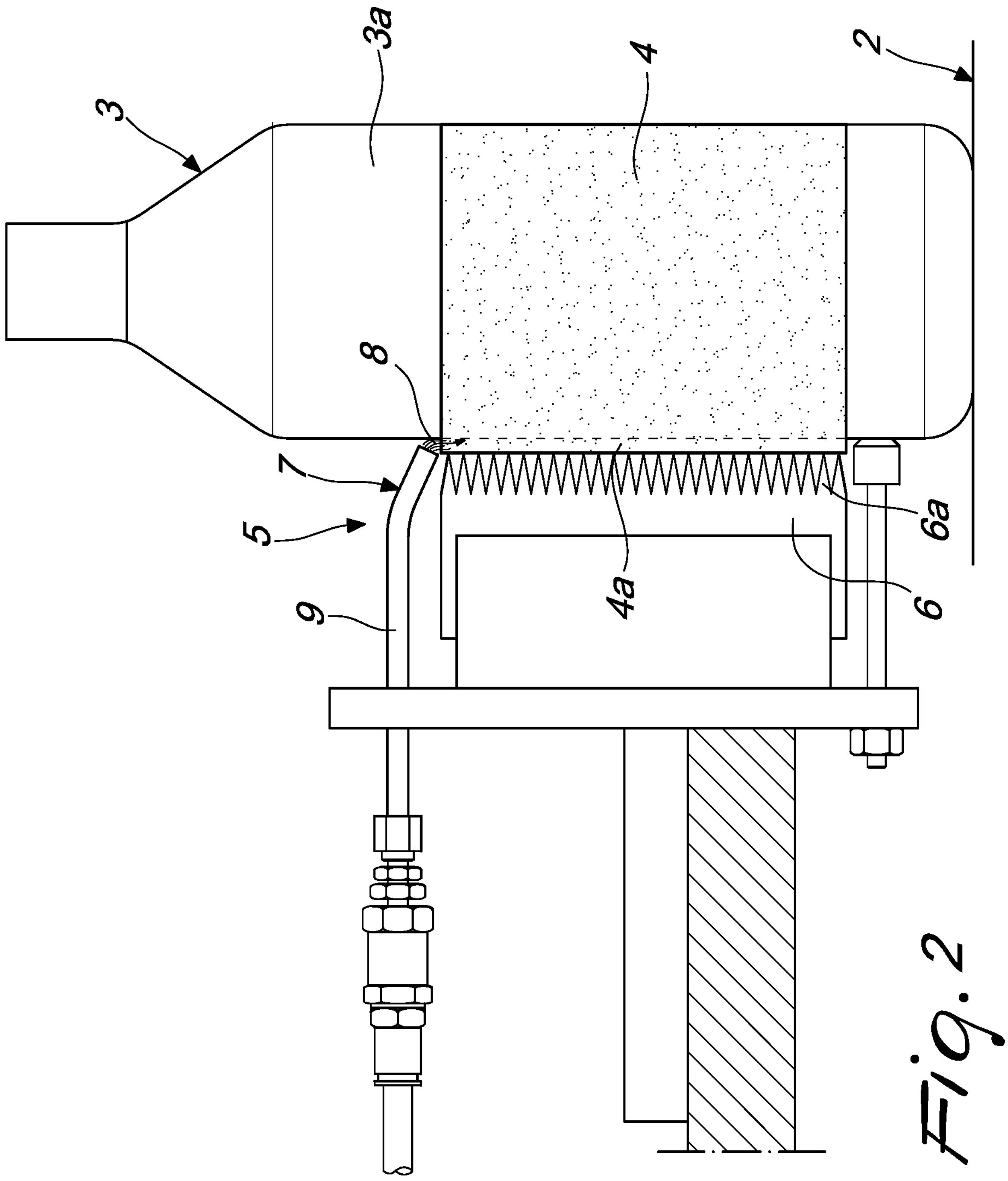
FIG. 2 is a cross-sectional front elevation view of a detail of the apparatus according to the invention.
Figure 3:
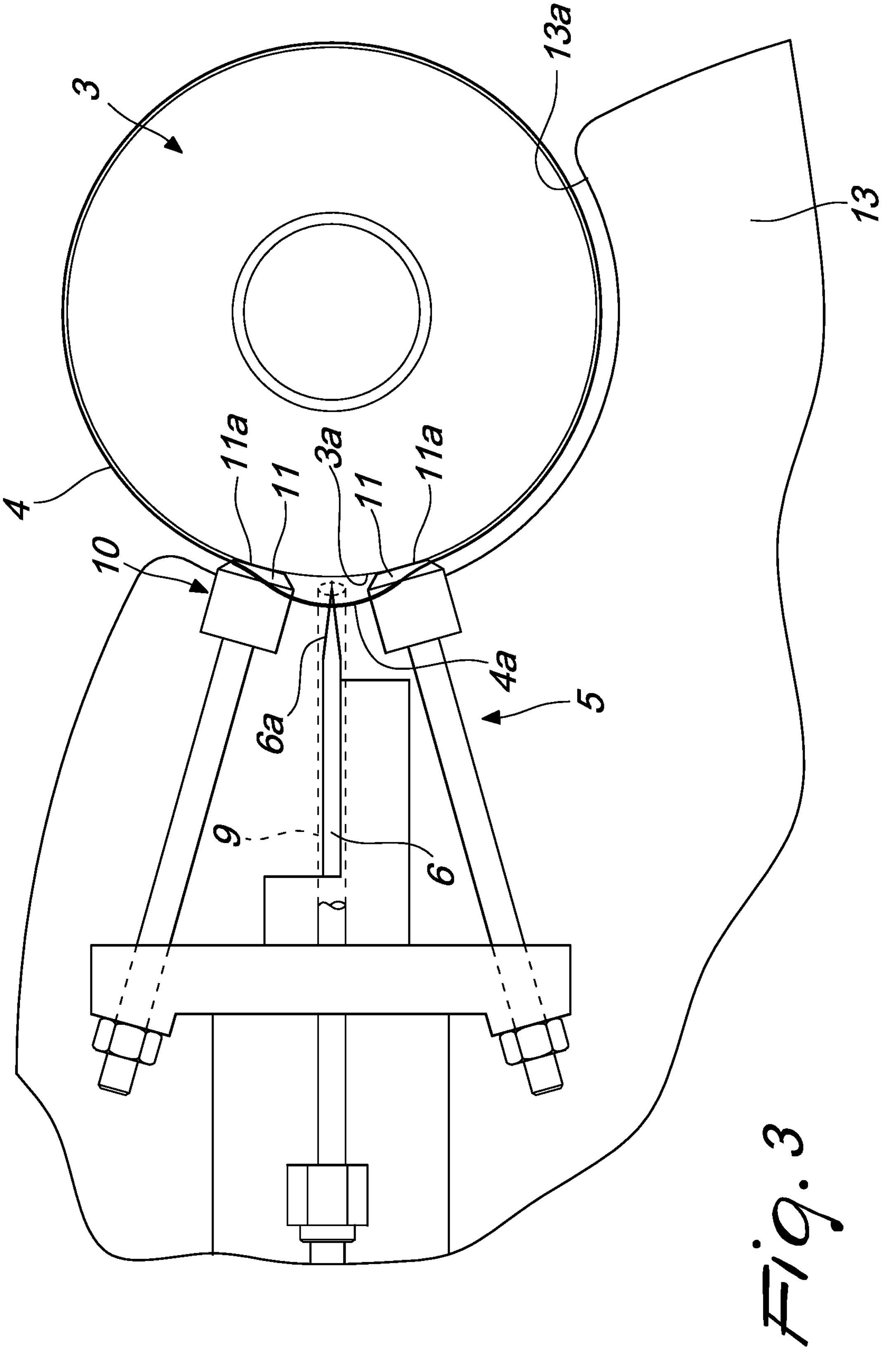
FIG. 3 is a partially transparent plan view of the detail of FIG. 2.

In particular, such introduction means 7 comprise, advantageously, dispensing means for dispensing at least one jet 8 of gas under pressure, which, in turn, comprise, conveniently, at least one nozzle 9 which is oriented, with its outlet, so as to emit the jet 8 of gas under pressure between the outer lateral surface 3*a* of the container 3 and the face of the portion 4*a* of the label 4 that is directed toward the outer lateral surface of the container 3, as shown in FIG. 2.

Advantageously, each cutting device 5 can also be provided with abutment means 10, against which the outer lateral surface of the container 3 is designed to abut, in order to ensure the positioning of the container 3 at a preset distance from the nozzle 9 and from the blade 6 of the corresponding cutting device 5.

For example, such abutment means 10 can be provided by a pair of support buffers 11, of soft material, such as rubber or the like, which are arranged on mutually opposite sides, with respect to the blade 6.

More specifically, the support buffers 11 are arranged, with their free abutment surface 11*a*, at a preset distance, in the direction of the axis of the container 3, with respect to the cutting portion 6*a* of the blade 6 of the corresponding cutting device 5, and are mutually angularly spaced apart with respect to the axis of the container 3, so that, with the container 3 abutting with its outer lateral surface 3*a* against the free abutment surfaces 11*a* of the support buffers 11, the correct distance is ensured of the cutting portion 6*a* of the blade 6 and of the outlet of the nozzle 9 from the outer lateral surface 3*a* of the container 3.

Preferably, as in the embodiment shown, the supporting means 2 comprise conveyor means 12 which make it possible to advance the container 3 along at least one advancement path.

In this case, the cutting device or devices 5 are arranged along such advancement path.

Conveniently, multiple containers 3 can be positioned on the conveyor means 12, arranged, for example, in succession, and each one bears a respective label 4 to be removed and is made to advance by the conveyor means 12, in order to bring the individual containers 3 to one or more cutting devices 5, which are distributed, advantageously, along the advancement path defined by the conveyor means 12.

Conveniently, the conveyor means 12 can comprise at least one linear conveyor 12*a*, such as, for example, a conveyor belt or mat or the like, which can advantageously be associated with a screw feeder device 12*b* which makes it possible to position the containers 3 at a preset distance or spacing from each other.

More preferably, the conveyor means 12 comprise at least one star conveyor 13, arranged along the advancement path of the containers 3 and provided with a plurality of receptacles 13*a*, which are distributed uniformly along its external perimeter and are designed to receive a respective container 3, during the rotation of the star conveyor 13 about its own axis.

In particular, in this case, it is possible for one or more cutting devices to be arranged at at least one of the receptacles 13*a* of the star conveyor 13.

Conveniently, for each one of the receptacles 13*a* of the star conveyor 13 there can be at least two cutting devices 5, which are arranged, mutually spaced apart, along the edge of the corresponding receptacle 8*a* so as to be able to act on mutually different portions 4*a* of the labels 4 of the containers 3.

Advantageously, as shown in FIG. 1, there can be at least two star conveyors 13, arranged mutually in series along the advancement path of the containers 3, on each one of which one or more cutting devices 5 can be arranged at each one of the corresponding receptacles 13*a*.

Advantageously, the two star conveyors 13 are substantially identical to each other and are arranged mutually side by side and in phase with each other, so that, by rotating in mutually opposite directions, the first star conveyor 13 encountered by the containers 3, along their advancement path, can deliver the containers 3 received in respective receptacles 13*a* to a respective receptacle 13*a* of the second star conveyor 13, which is arranged downstream of the first star conveyor 13, so that, for at least one portion of its advancement path, each container 3 can be simultaneously in engagement with a receptacle 13*a* of both star conveyors 13, so that cutting devices 5 that are arranged in diametrically opposite zones with respect to its axis can act on the corresponding label 4.

Conveniently, there are means for retrieving the fragments of labels 4 that are removed from the containers 3 following the activation of the cutting devices 5.

Such retrieval means can, for example, comprise suction means arranged, conveniently, above the cutting devices 5 and capable of retrieving the fragments of label 4 removed from the containers 3 and of conveying them to a special gathering unit.

Optionally, the retrieval means can comprise means for blowing the fragments of label 4 toward the gathering unit.

Advantageously, the conveyor means 12 can take the containers 3 toward at least one elimination device, not shown, which is designed to complete the removal of the labels 4 from the containers 3, for example using a mechanical action.

In particular, the elimination device can, for example, be provided by a device for washing the containers 3, arranged downstream of the cutting device or devices 5, along the direction of advancement of the containers 3.

Conveniently, such washing device comprises a washing machine, capable of performing the washing of the containers 3, conveniently using a washing liquid which is constituted by a high-temperature solution of water and detergent products and more preferably in a bath of water and soda, so as to make it possible, by virtue of the use of the washing liquid at high temperature and by virtue of the mechanical action thereof on the containers 3, to detach the strips of adhesive of the labels 4 of the containers 3 from the outer lateral surface 3*a* of those containers, so as to complete the removal of the corresponding labels 4.

Operation of the apparatus for removing labels from reusable containers, according to the invention, is the following.

The containers 3 bearing the applied labels 4 to be removed are arranged on the supporting means 2 and, in particular, on the conveyor means 12, so that they are made to advance by the linear conveyor 12*a* toward the star conveyors 13, along the advancement path.

The individual containers 3 are then picked up by the receptacles 13*a* of the first star conveyor 13 that they encounter in their advancement path, which delivers each one of them to a respective receptacle of the second star conveyor 13, which is arranged downstream of the first.

During the engagement of the individual containers 3 with the receptacles 13*a* of the star conveyors 13, the cutting devices 5 arranged at the receptacles 13*a* of the star conveyors 13 and engaged by the containers 3 are activated and, more specifically, the nozzles 9 thereof are activated, so as to introduce gas under pressure between the outer lateral surface of the containers 3 and the portions 4*a* of the labels 4 of the containers 3 located at the activated cutting devices 5.

In this manner, a movement is actively imparted on the portions 4*a* of the labels 4 of the containers 3 that are located at the activated cutting devices 5 away from the outer lateral surface 3*a* of the corresponding container 3 and toward the corresponding blades 6, until such portions 4*a* of the labels 4 are brought against the cutting portion 6*a* of the corresponding blades 6 with consequent at least partial cutting of the labels 4.

The fragments of labels 4 that are removed from the containers 3 following the activation of the cutting devices 5 are taken away by the pickup device.

At this point, the containers 3 with the labels 4 thus cut and with the fragments of label 4 that remain attached to them by way of the strips of adhesive, continuing along their advancement path on the conveyor means 12, can reach a washing device, at which they are subjected to washing with washing liquid at high temperature, so as to obtain the complete detachment of the labels 4 from the containers 3.

In practice it has been found that the invention fully achieves the intended aim and objects by providing an apparatus for removing labels from reusable containers that makes it possible to effectively obtain the removal of the labels from the containers so as to prepare them for reuse.

It must be noted that the possibility of having multiple cutting devices that act on the same label of each individual container makes possible the detachment of fragments of label from the containers prior to the step of washing the containers, thus preventing the washing machine from filling up with labels.

Another advantageous characteristic of the invention is the absence, in carrying out the removal of the labels, of contact and of relative movement between blade and container, which preserves the lifetime of the container and the number of potential reuses of that container.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102020000006946 from which this application claims priority are incorporated herein by reference.

The invention claimed is:

1. An apparatus for removing labels from reusable containers, comprising: supporting means for at least one reusable container, on an outer lateral surface of which at least one label to be removed is applied, and further comprising at least one cutting device which is provided with at least one blade which is configured to be arranged, with a cutting portion thereof in a position that faces at least one portion of said at least one label, and movement means for moving said at least one portion of said at least one label which are configured to actively impart, on command, to said at least one portion of said at least one label, a movement away from the outer lateral surface of said at least one container, in order to bring said at least one portion of said at least one label against the cutting portion of said at least one blade;

wherein the cutting portion of said at least one blade is located radially outward of and faces toward an outwardly facing surface of said at least one portion of said at least one label, and the movement of said at least one portion of said at least one label away from said outer lateral surface of said at least one container brings said outwardly facing surface of said at least one portion of said at least one label into contact with said cutting portion;

wherein said movement means comprise introduction means for introducing a gas under pressure between the outer lateral surface of said at least one container and an inwardly facing surface of said at least one portion of said at least one label that is directed toward the outer lateral surface of said at least one container to create a difference in pressure between the inwardly facing surface of said at least one portion of said at least one label and the outer lateral surface of said at least one container and for movement of said outwardly facing surface of said at least one portion of said at least one label into contact with said cutting portion so as to cut said at least one label.

2. The apparatus according to claim 1, wherein said introduction means comprise dispensing means for dispensing at least one jet of gas under pressure.

3. The apparatus according to claim 2, wherein said dispensing means comprise at least one nozzle which is oriented, with an outlet thereof, so as to emit said jet of gas under pressure between the outer lateral surface of said at least one container and the inwardly facing surface of said at least one portion of said at least one label that is directed toward the outer lateral surface of said at least one container.

4. The apparatus according to claim 1, wherein said supporting means comprise conveyor means for conveying said at least one container along at least one advancement path, said at least one cutting device being arranged along said at least one advancement path.

5. The apparatus according to claim 4, wherein said conveyor means comprise at least one star conveyor comprising receptacles, said at least one cutting device being arranged at at least one of said receptacles of said at least one star conveyor.

6. The apparatus according to claim 1, wherein the at least one nozzle and the cutting device are mounted such that the at least one nozzle and the cutting device, including the cutting portion, are maintained in positions spaced from the at least one container so as to avoid contact with said at least one container.

7. The apparatus according to claim 1, wherein the cutting device is arranged such that relative movement between the cutting portion and the at least one container is absent during cutting of said at least one label.

8. The apparatus according to claim 1, wherein the cutting portion extends parallel to the outwardly facing surface of said at least one label.

9. A method for removing labels from reusable containers, comprising the steps of:

arranging a cutting portion of at least one blade in a position that faces an outwardly facing surface of at least one portion of at least one label applied to an outer lateral surface of at least one container, actively imparting a movement to said at least one portion of said at least one label away from said outer lateral surface of said at least one container, in order to bring the outwardly facing surface of said at least one portion of said at least one label against the cutting portion of said at least one blade;

wherein said step of actively imparting said movement to said at least one portion of said at least one label comprises at least one step of creating a difference in pressure between an inner face of said at least one portion of said at least one label that is directed toward the outer lateral surface of said at least one container;

wherein said step of creating said difference in pressure comprises a step of introducing a gas under pressure between the inner face of said at least one portion of said at least one label that is directed toward the outer lateral surface of said at least one container and the outer lateral surface of said at least one container;

wherein said step of introducing said gas under pressure comprises a step of dispensing via at least one nozzle, a jet of gas under pressure which is oriented toward a region comprised between the inner face of said at least one portion of said at least one label that is directed toward the outer lateral surface of said at least one container and the outer lateral surface of said at least one container.

10. The method according to claim 9, further comprising, after said step of actively imparting said movement to said at least one portion of said at least one label, at least one step of washing said at least one container.

11. An apparatus for removing labels from reusable containers, comprising:

supporting means for at least one reusable container, on an outer lateral surface of which at least one label to be removed is applied;

a cutting device with at least one blade which is configured and arranged with a cutting portion thereof located radially outward of the at least one label, the cutting portion extending along a height of the at least one label in a position that faces an outwardly facing surface of at least one portion of said at least one label, and movement means for moving said at least one portion of said at least one label and configured to actively impart, on command, to said at least one portion of said at least one label, a movement away from the outer lateral surface of said at least one container, in order to bring said outwardly facing surface of said at least one portion of said at least one label against the cutting portion of said at least one blade in order to cut through said at least one portion of said at least one label in a direction from the outwardly facing surface of said at least one portion of said at least one label toward an inwardly facing surface of said at least one portion of said at least one label;

an abutment device positioned for abutting the at least one container at a location below said at least one label;

wherein said movement means comprise introduction means, including a nozzle, for dispensing a jet of gas under pressure into a region between the outer lateral surface of said at least one container and the inwardly facing surface of said at least one portion of said at least one label to create a difference in pressure between the inwardly facing surface of said at least one portion of said at least one label and the outer lateral surface of said at least one container;

wherein the abutment device is configured such that the at least one nozzle and the cutting device, including the cutting portion, are maintained in positions spaced from the at least one container so as to avoid contact with said at least one container.

12. The apparatus according to claim 11, wherein the cutting portion extends parallel to the outwardly facing surface of said at least one label.

* * * * *